United States Patent [19]

Carbo et al.

[11] Patent Number: 4,556,498
[45] Date of Patent: Dec. 3, 1985

[54] INTERNAL LUBRICANT WHICH ENABLES EPOXY PHENOLIC EXTERIOR COATED TFS PLATE TO BE TRIPLE DRAWN AND IRONED

[75] Inventors: Adelaida Carbo; Raymond H. Good, both of Barrington, Ill.

[73] Assignee: American Can Company, Greenwich, Conn.

[21] Appl. No.: 589,793

[22] Filed: Mar. 15, 1984

Related U.S. Application Data

[63] Continuation of Ser. No. 260,393, May 4, 1981, abandoned.

[51] Int. Cl.[4] .............................................. C10M 1/32
[52] U.S. Cl. ................................ 252/51.5 R; 427/327; 428/416; 428/484; 252/52 A
[58] Field of Search .................... 252/12, 12.2, 52 R, 252/51.5 R; 427/327; 428/416, 484; 585/9, 10

[56] References Cited

U.S. PATENT DOCUMENTS

| | | | |
|---|---|---|---|
| 3,639,316 | 2/1972 | Argiro | 585/9 |
| 4,237,188 | 12/1980 | Hoke | 428/416 |
| 4,256,594 | 3/1981 | Rysek | 428/416 |
| 4,336,150 | 6/1982 | Dorrell | 252/12 |

Primary Examiner—Jacqueline V. Howard
Attorney, Agent, or Firm—Ernestine C. Bartlett; Paul R. Audet; Stuart S. Bowie

[57] ABSTRACT

This disclosure includes a means by which a precoating for a metal plate can be made to withstand stresses imposed upon it and the plate during forming operations such as stretching and drawing by first adding a dry film lubricant to the coating. The lubricant has a softening point as high or higher than the coating.

14 Claims, No Drawings

INTERNAL LUBRICANT WHICH ENABLES EPOXY PHENOLIC EXTERIOR COATED TFS PLATE TO BE TRIPLE DRAWN AND IRONED

This is a continuation of application Ser. No. 260,393, filed 5/4/81, now abandoned.

BACKGROUND OF THE INVENTION

This disclosure relates to the lubrication of precoated metal such as tin free steel to be used in a multiple forming operation wherein the finished product has a continuous coating left on it. Such lubrication is necessary in order to protect the precoated material from being scuffed, torn or otherwise damaged during forming. It is common to use topically applied lubrication over the precoating. The lubrication is applied by means of rollers, sprays, brushes, electrostatic dispersion or spot application either after the precoating process or just prior to the press operation wherein the product is made. It is also critical that the right lube be selected, i.e. a lubricated metal. The most economical approach to such lubrication over a precoating has been by means of a hot spray applied at speeds of 600 to 800 surface feet per minute simultaneously to both sides of precoated coiled metal. More specifically, the coil coater takes the precoated sheet after it cools from the baking oven where the precoating is cured and applies a thin film of lube by hot spray. Because of the high speed, there is no visible bloom of any internal lubricant at the surface of the precoated stock.

A slower process used for coating sheets as opposed to coils handles 110—3' long sheets per minute on one side only. Thus, the speed of this arrangement is about one-fourth that of the coil coater which coats both sides simultaneously. Unlike the coil coater, there is a 10 minute bake to bloom the internal lube. Each sheet is held by a wicket in a wicketing rack as it passes through the oven. Such an arrangement permits blooming with relative uniformity such that a consistent low level of lubricant (up to about 1.5% by weight) is visible, with the sheet coating operation. In addition, topically applied lube is more accurately applied at the slow sheet coating speed. In contrast, the coil coater has speed but little or no accuracy in terms of topical application rates or uniformity. The preferred amount of lube is 12 mg per square foot per side for both a coil and sheet coater. The tolerance on both is ±mg 7 mg which is more difficult to achieve on the coil coater then with a sheet coater.

It is also critical that the right lube be selected. A lube which will not affect the adhesion of the precoating to the metal substrate and which will be compatible with the use requirements of the articles formed by the multiple forming operation. The lubricant has however incompatibility with the precoating but does not affect the adhesion of the precoating during the multiple forming operation or the subsequent use of the formed article. The incompatibility works to make the lubricant float to the surface of the coating during curing; this is called blooming. Either condition would be acceptable. Therefore, it becomes important to select a lubricant which has the required incompatibility but will mix with the precoating without separating before application and provides the lubricating properties necessary to overcome the extreme pressures during a metal forming operation whereby the precoating and the metal are protected from such stresses.

It has been the practice to add a small amount of lubricant to the precoating in order to work with a subsequent topical overlube. More particularly, less than 2% by weight of lubricant has been added to the precoatings and that in combination with a topical overspray has been found to provide sufficient lubrication when the topical overspray is applied uniformly at the prescribed rate.

In the preferred embodiment the formed article made in a multiple forming operation is as disclosed in U.S. Ser. No. 234,428 filed Feb. 13, 1981 (TOOL FOR MAKING CONTAINER: U.S. Ser. No. 234,452 filed Feb. 13, 1981 (CONTAINER) and U.S. Ser. No. 234,451 filed Feb. 13, 1981 (PROCESS FOR MAKING CONTAINER). In those applications the metal is subjected to ironing such that the criticality of lubrication becomes more severe. Most coating lubricant combinations tend to break down due to the load and stress of such processing. It is, therefore, important to have specific lubricating properties which can withstand the heat and pressure occurring during an ironing operation without any additional coolant or lubricant.

OBJECTS OF THE DISCLOSURE

It is, therefore, an object of the disclosure to teach a way in which adequate lubricant can be available to provide for the stresses incurred during multiple forming operations.

It is another object to provide a means by which the lubricant can be adequately applied at a rate sufficient to provide the necessary lubrication to permit multiple forming of precoated material without damage to the coating of the material.

It is still a further object of the present disclosure to teach a specific and preferred lubricant which will operate to facilitate the high speed multiple forming of a food can.

SUMMARY OF THE DISCLOSURE

Consistent with the objects and in order to overcome the problems of prior techniques for applying lubrication to precoated metal a specific lubricant which operated in accordance with the level of stress applied during the multiple forming operation is disclosed. More particularly, during forming at high levels of pressure, heat is generated. The lubricant must be able to work under both the heat and pressure in order to protect the precoating and the precoated metal from destruction. It has been found that dry film type lubricants can be dispersed in solvent and incorporated in the coating so that at the temperature resulting during forming operations, the lubricant is available at the surface as a hard, solid protective layer. It is essential that the melting point of the solid lubricant be adjusted to cooperate with the levels of heat existing during the multiple forming steps whereby the lubricant first becomes available in a flowable form at the time when the temperature exceeds a predetermined level. In the preferred embodiment temperatures around 280° F. have been found. To solve problems of scuffing and tearing on drawn and ironed containers by the processes mentioned in those prior copending applications noted above, containers have been precoated with epoxyphenolic or epoxy urea formaldehyde formulations containing a high melting lubricant applied upon the surface which is ultimately external. These high melting temperature waxes or dispersions in n-butanol can be mplyethylene or Carnauba. The technique can be used in conjunction with any polymer hydrocarbon of Fisher-Tropsch type which can function as a slip agent so long as the melting point is adjusted to work with the particular multiple forming conditions by including sufficient amounts of such waxes in the precoating composition. The need for additional topical lubrication is reduced or eliminated and the ability to produce a finished article formed from precoated metal can be maintained even in a high speed high stress operation such as combined drawing and ironing.

DETAILED DESCRIPTION OF THE DISCLOSURE

This invention relates to the precoating of metal plate of thin gauge and various types for subsequent use in being formed into a container having a diameter which is usually less than its height. Such containers are commonly used for packing processed foods and must be capable of withstanding internal pressure during processing at high temperature and the external pressure due to the vacuum generated upon cooling. The precoating with which this particular invention is concerned is that coating which is on the surface that ultimately becomes either the inside or outside of the container. That coating must be capable of withstanding the severe drawing and redrawing operations including bottom profiling which occur in converting at high speed the flat thin gauged precoated sheet into hollow cylindrical bottomed vessels. Normally coatings are topically lubed to aid fabrication. We have found incorporation of internal lubrication aids can fabrication even without topical lubrication.

Can container size in this disclosure uses the conventional can makers terminology, (The can makers convention gives the diameter across the completed doubleseam in inches plus sixteenths of an inch then the height in inches plus sixteenths of an inch). Therefore, a container with a 4 4/16" diameter by 3 7/16" height would be called a 404 by 307.

The material used in connection with forming containers as disclosed herein is 65# per base box. This reference to the base box terminology for base weight is familiar to can makers. Such terminology Such terminology originally referred to the amount of steel in a base box of tin plate consisting of 112 sheets of steel 14" by 20", or 31,360 square inches of plate. Currently, the base box has related to base weight reference to the amount of steel in 31,360 square inches of steel whether in the form of coil or cut sheet. Tin free steel of the chrome type is commonly designated TFS-CT; electrolytically deposited tin on steel is designated ETP. The amount of tin is also designated in terms of so many pounds per base box.

The coating can be experimentally tested by means of a tape test before and/or after food sterilization wherein each sample of a container multiply formed of precoated stock can be tested with a pressure sensitive adhesive type such as a 1" wide strip of 3M tape #160 applied to the cured coating before and after it is drawn and multiply redrawn. The tape is pressed to the surface with sufficient pressure to make complete contact (removing the air bubbles there between). The tape test requires that the tape be quickly peeled from the coating surface to which it is adhered in an effort to peel the coating, lifting any poorly adhering coating. In order to further test the coating adhesion, X's are scribed with a sharp pointed instrument in the coating before the tape is applied. These X's represent a freshly made scored edge which provides sites for the initiation of any peeling that might occur.

Once a container has been made from precoated stock by means of multiple forming operations it is important to be able to ascertain whether or not the container is adequately protected by the precoating. A rapid test to demonstrate whether or not the outside coating has fractured during the multiple forming operations includes the use of copper sulfate. Each container is immersed in a copper sulfate solution for two minutes. The solution is made by mixing 26½ ozs of copper sulfate crystals with 6½ fluid ozs of concentrated hydrochloric acid diluted with one gallon of distilled water. After immersion in the solution the can is rinsed in water then examined visually for copper deposits. Any traces of copper on the surface indicate a lack of coating continuity and, more particularly, shows the exact nature of the discontinuity in terms of shape and location.

A further test which is more representative of the planned use for such containers is called, a "water pack test". The multiply formed containers are filled with distilled water almost to the top. A ¼" headspace remains at the time the containers are closed and a vacuum of 13" of mercury is applied. Such cans are then placed in a retort and steam processed for 90 minutes at 265° F. Subsequent to the retort processing, the cans are pressure cooled for 7 minutes. This procedure subjects the container to conditions similar to those which would be incurred during a use of the container for a pack of comestibles. The retorted containers are then evaluated and more specifically, the outside coating is examined after the containers have been allowed to air dry over night. These containers can also be stored in a high humidity chamber if necessary to encourage oxidation of any exposed exterior metal surface. Such oxidation indicates the degree of resistance the precoated container has to processing. Similarly, copper sulfate test can also be used. That is to say that, after the processing test they may be immersed in copper sulfate to specifically isolate areas of coating discontinuity.

EXAMPLE 1

A 20% dispersion of a high melting polyethylene (280° softening point) in n-butanol SL280 by Daniel Products was added to an epoxy-urea-formaldehyde formulation GL650C136, manufactured by SCM Glidden Coatings and Resins. The level of dry lubricant used ranged from one-half to 6% of the total non-volatile resin solids in the coating, and thereby allowed a two-fold function:
 (a) As internal lubricant only, at one-half to 2%, the polyethylene addition in the coating enabled multiple drawing with ironing of 65 lb TFS plate precoated with this composition at speeds up to 125 spm.
 (b) As a complete lubricant at 2, 4 and 6% levels, the polyethylene permits a triple drawing and ironing operation (no topically applied petrolatum was necessary to form a commercially acceptable can without scuffing).

The adhesion and integrity of the coating with the polyethylene lubricant were excellent even after retort processing at 265° F. for 90 minutes.

EXAMPLE 2

A 24% dispersion of polyethylene SL177 (280° softening point) in xylene by Daniel Products was added in an epoxyphenolic coating made by Mobil Chemical: MC 9372-006.

The levels of lubricant used were 2% and 4% by weight of the total resin solids in the coating. Applied at 9 mg/4 sq in and baked 9 minutes at 400° F., the coating allows triple drawing with ironing of 65 lb TFS.

EXAMPLE 3

A 24% dispersion of the same polyethylene SL177 in the preceding example was used in combination with a 20% dispersion of a polymer wax SL425 by Daniel Products (225° F. softening point) at a 4:1 ratio in the Mobil Chemical epoxy phenolic MC 9372-006. The low level of additional polymer wax improved the anti-scuff drawing and ironing properties of this epoxy phenolic on both 65 lb TFS and 65 lb No. 25 ETP.

EXAMPLE 4

A 20% dispersion of polyethylene SL 50 (225° F. softening point in n-butanol, by Daniel Products, was incorporated in three white pigmented inside enamels. The first was Glidden's phenolic-modified epoxy-urea formaldehyde GL588-92C. The others were Watson-Standard's WS28-419 and WS28-420, both vinyl organosols. At 2% of the dry polyethylene, these precoats provided good fabrication with no loss of adhesion observed. The SL50 is approved by the Food and Drug Administration for use with coatings in contact with food.

The following examples have lower melting point Carnauba waxes and do not perform as well in a continuous operation thereby indicating the important of the condition of the lube at the point where the forming stress and heat occurs.

EXAMPLES 5 AND 6

Two coatings containing Carnauba wax dispersed at 1.95% solids on solids in a Mobil Chemical epoxyphenolic formulation MC 9372-007 and an epoxy-urea-formaldehyde formulation MC 8406-020 were evaluated as outside precoatings for drawn and ironed cans. The cans were made on the pilot line by first cupping in one press then by multiple forming or redrawing in another press. On transferring to a press having consecutive forming sequences, the precoat containing Carnauba wax failed due to the greater heat. The lag time between cupping and forming stations on the former two press arrangements is such that there was heat dissipation between stages. In the press with a continuous sequence where higher instantaneous temperatures occur, Carnauba wax was not effective. Consequently, lubricants with higher softening points as in Examples 1 through 4 are necessary in a continuous high heat multiple forming sequence.

EXAMPLES 7 AND 8

Dispersions of Carnauba at 1% and 2% solids on solids in Glidden Coatings epoxy-urea-formaldehyde GL588-44 were prepared and tested as outside precoatings for high speed multiple forming by drawing with ironing. The 1% example had a trace of surface roughness after a water test. The 2% permitted good cans to be fabricated and they passed both the water pack and copper sulfate tests. While this wax was sufficient for triple drawing with ironing on the two press arrangement, the results on the press with a continuous sequence are consistent with those found in Examples 5 and 6.

The softening point is the temperature or range of temperature at which a substance softens. To determine this property, a thermomechanical analyzer, Perkin-Elmer TMS-1, is used.

A sample of the coated plate is punched from a sheet and placed under a weighted probe. A predetermined programmed range of temperatures are then scanned. When the coating starts to soften, the probe penetrates the coating, and a distinct break occurs on the recorder chart. The softening point is that temperature corresponding to the midpoint of a line drawn tangent to the break in the curve, between the pre-transition and post-transition base lines.

The softening point is a factor influencing the drawing and ironing properties of a coating. If the internal lubricant is soft or liquid, the softening point of a coating is depressed to a greater extent. Thus. 0.5% lanolin in a Glidden formulation results in a softening point of 183° F. for the cured coating, while a hard, solid wax such as polyethylene with a melting point of 280° F. when incorporated in the same Glidden formulation, exhibits a softening point of 194° F. The first example failed to draw and iron satisfactorily; the second example passed this fabrication test.

The following Table summaerizes the foregoing Examples.

| EX-AMPLE | COATING TYPE | COATING CODE | INTERNAL LUBE (m pt) °F. | WT % | SOFT-ENING POINT | C.O.F. | FABRICATION | WATER PACK | CuSo4 TEST |
|---|---|---|---|---|---|---|---|---|---|
| 1. | epoxy-UF | GL 588-67M | 280° polyethylene | 0.5% | 194° F. | — | no scuffing | good | passed |
|  | epoxy-UF | GL 588-67A | 280° polyethylene | 1.0 | 194 | .09 | no scuffing | good | passed |
|  | *epoxy-UF | GL 588-67B | 280° polyethylene | 2.0 | 192 | .08 | no scuffing | good | passed |
|  | *epoxy-UF | GL 588-67C | 280° polyethylene | 4.0 | 189 | .08 | no scuffing | good** | passed |
|  | *epoxy-UF | GL 588-67D | 280° polyethylene | 6.0 | 185 | .08 | no scuffing | good | passed |
| 2. | epoxy-phenolic | MC 9372-006 | 280° polyethylene | 2.0 | 183 | .05 | no scuffing | good | passed |
| 3. | epoxy-phenolic | MC 9372-006 | 280° polyethylene with 225° polymer wax | 2.0 0.5 | 190 | .05 | no scuffing | good | passed |
| 4. | epoxy-UF (mod.) | GL 588-92C | 225° polyethylene | 2.0 | — | — | no stripping problem on punch | — | — |
|  | vinyl | WS 28-419 | 225° polyethylene | 2.0 | — | — | no stripping problem on punch | good | — |
|  | vinyl | WS 28-420 | 225° polyethylene | 2.0 | — | — | no stripping problem on punch | good | — |
| 5. | epoxy-phenolic | MC 9372-007 | 185° Carnauba | 1.95 | 198 | .06 | no scuffing on pilot line | good | passed |

-continued

| EX-AMPLE | COATING TYPE | COATING CODE | INTERNAL LUBE (m pt) °F. | WT % | SOFT-ENING POINT | C.O.F. | FABRICATION | WATER PACK | CuSo4 TEST |
|---|---|---|---|---|---|---|---|---|---|
| 6. | epoxy-UF | MC 8406-020 | 185° Carnauba | 1.95 | 180 | — | no scuffing on pilot line | good | passed |
| 7. | epoxy-UF | GL 588-44A | 185° Carnauba | 1.0 | — | — | no scuffing on pilot line | trace roughness | passed |
| 8. | epoxy-UF | GL 588-44B | 185° Carnauba | 2.0 | — | — | no scuffing on pilot line | good | passed |

N.B. *NO TOPICALLY APPLIED LUBRICANT ON THESE SAMPLES.
**BEST VARIABLE IN EXAMPLE 1.

Other examples given in the table herein show that the softening point is inversely proportional to the concentration of dry film or wax as internal lube. These examples work in spite of the lower softening points because of partial migration of the lubricant to the surface of the coating. High melting waxes form a hard, protective layer over the coating film, while low melting waxes and liquid lubricants liquefy, wipe off, and leave a relatively unprotected coating film vulnerable to the fabrication stresses.

While specific additions of various dry film lubricants such as polymer waxes and Carnauba wax have been disclosed and explained, the invention in its broadest context is the use of a dry film lubricant added to a coating in sufficient quantity to effectively raise the softening point of the coating. That is to say that, the dry film lubricant must have a softening point as high as the coating or higher in order to be useful in connection with protecting the coating during a multiple forming operation. Therefore, in the claims which follow any dry film material added to a precoating and the application of the combination to a metal substrate is sought to be covered.

What is claimed is:

1. A method of providing a metal substrate with a coating having increased lubricity and resistance to scuffing when the coated metal is subjected to multiple forming operations, the method including the following steps: providing a vinyl, epoxy-phenolic or epoxy-urea-formaldehyde coating material which retains adherence to a metal substrate when the latter is formed by stretching and forming operations, mixing from about 0.5 to 6% of a dry film lubricant selected from the group consisting of polyethylene wax and Carnauba wax into the coating material before application to the substrate, the dry film lubricant having a melting point higher than that of the basic coating material into which it is mixed, and applying the coating and lubricant material combination to the metal substrate in a thin film layer which is then cured to adhere it to the metal substrate, the cured coating having a softening point of at least 185° F.

2. A method of increasing the lubricity and resistance to scuffing of a curable metal coating composition, wherein to a metal coating composition comprising a resin selected from the group consisting of vinyl, epoxy-phenolic and epoxy-urea-formaldehyde resins which coating retains adherence to a metal substrate after curing and which is capable of withstanding stretching and forming operations, is added from about 0.5 to 1% by weight of a dry film lubricant having a melting point higher than that of the coating composition per se, said dry film lubricant being selected from the group consisting of a polyethylene wax and Carnauba wax, each having a melting point of at least 185° F.

3. A precoating composition for a metal substrate adapted to be cured to form an adherent film thereon, comprising a coating material comprising a resin selected from the group consisting of vinyl, epoxy-phenolic and epoxy-urea-formaldehyde resins which adheres well to metal surfaces after curing and which is capable of being formed with the metal by stretching and drawing operations, and from about 0.5% by 6% by weight of a dry film lubricant uniformly mixed with the coating material, the said dry film lubricant having a melting point higher than that of the said coating material per se and being selected from the group consisting of a polyethylene wax and Carnauba wax, each having a melting point of at least 185 F.

4. The method as defined in claim 1, wherein the dry film lubricant is a polyethylene wax.

5. The method as defined in claim 4, wherein 1% by weight of polyethylene wax is added to the coating material.

6. The method as defined in claim 5, wherein 0.5% by weight of polyethylene wax is added to the coating material.

7. The method as defined in claim 6, wherein said dry film lubricant has a melting point in excess of 210° F. (99° C.).

8. The method as defined in claim 1, wherein the coating material is an epoxy phenolic resin material and said dry film lubricant is polyethylene wax.

9. A method of making a formed article from a metal substrate having a cured coating thereon, the method including the steps of: (1) providing a vinyl, epoxy-phenolic or epoxy-urea-formaldehyde coating material which retains adherence to a metal substrate when the latter is formed by a stretching and forming operation; (2) mixing from about 0.5% to 1% of a dry film lubricant selected from the group consisting of polyethylene wax and Carnauba wax, each having a melting point of at least 185° F. into the coating material before application to the substrate to enhance the lubricity and resistance to scuffing of the coated metal during the said operation, the dry film lubricant having a melting point higher than that of the basic coating material into which it is mixed; (3) applying the coating and lubricant material mixture to the metal substrate in a thin film layer; (4) curing said mixture to form an adherent coating on the metal substrate having a softening point of about 185° F.; and (5) thereafter subjecting the coated substrate to a forming operation which softens the lubricant material on the cured coating during said forming operation.

10. A method according to claim 9 for use to make a food or beverage container wherein the forming operation is a multiple drawing or multiple drawing and ironing can-making operation.

11. The precoating of claim 3 wherein the dry film lubricant is a polyethylene wax.

12. The precoating of claim 11 wherein 1% by weight of polyethylene wax is added to said coating material.

13. The precoating of claim 11 wherein said dry film lubricant has a melting point in excess of 210° F.

14. The precoating of claim 13 wherein the coating material is an epoxy phenolic resin material and the dry film lubricant is polyethylene wax.

* * * * *